US006919527B2

(12) United States Patent
Boulos et al.

(10) Patent No.: US 6,919,527 B2
(45) Date of Patent: Jul. 19, 2005

(54) MULTI-COIL INDUCTION PLASMA TORCH FOR SOLID STATE POWER SUPPLY

(75) Inventors: Maher Boulos, Sherbrooke (CA); Jerzy Jurewicz, Sherbrooke (CA)

(73) Assignee: Tekna Plasma Systems, Inc., Quebec (CA)

( * ) Notice: Subject to any disclaimer, the term of this patent is extended or adjusted under 35 U.S.C. 154(b) by 13 days.

(21) Appl. No.: 10/749,373

(22) Filed: Jan. 2, 2004

(65) Prior Publication Data

US 2005/0017646 A1 Jan. 27, 2005

Related U.S. Application Data

(60) Division of application No. 10/265,586, filed on Oct. 8, 2002, now Pat. No. 6,693,253, which is a continuation-in-part of application No. 09/970,950, filed on Oct. 5, 2001, now abandoned.

(51) Int. Cl.[7] ................................................ B23K 10/00

(52) U.S. Cl. ........................... 219/121.52; 219/121.36; 315/111.51

(58) Field of Search ........................ 315/111.21–111.71; 219/121.31, 121.36, 121.37, 121.41, 121.43, 121.45, 121.46, 121.52, 121.59

(56) References Cited

U.S. PATENT DOCUMENTS

| | | | | | |
|---|---|---|---|---|---|
| 3,296,410 | A | | 1/1967 | Hedger | 219/121.52 |
| 3,862,393 | A | | 1/1975 | Dundas et al. | 219/121.36 |
| 5,146,137 | A | | 9/1992 | Gesche et al. | 315/111.21 |
| 5,200,595 | A | | 4/1993 | Boulos et al. | 219/121.52 |
| 5,285,046 | A | | 2/1994 | Hansz | 219/121.47 |
| 5,349,154 | A | * | 9/1994 | Harker et al. | 219/121.41 |
| 5,560,844 | A | | 10/1996 | Boulos et al. | 219/121.59 |
| 6,291,938 | B1 | | 9/2001 | Jewett et al. | 315/111.51 |
| 6,340,863 | B1 | | 1/2002 | Ikeda et al. | 315/111.21 |
| 6,388,226 | B1 | * | 5/2002 | Smith et al. | 315/111.51 |
| 6,552,295 | B2 | * | 4/2003 | Markunas et al. | 219/121.36 |
| 6,568,215 | B2 | * | 5/2003 | Schofield et al. | 219/683 |

FOREIGN PATENT DOCUMENTS

| | | | |
|---|---|---|---|
| DE | 3130908 | A1 | 3/1983 |
| EP | 0977470 | A2 | 2/2000 |
| FR | 2690638 | A1 | 11/1993 |
| WO | WO 03/032693 | A1 | 4/2003 |

OTHER PUBLICATIONS

I.J. Floyd and J.C. Lewis, Nature, vol. 211, No. 5051, p. 841.

J. Reece Roth, Industrial Plasma Engineering, vol. 1, Bristol: Institute of Physics Publishing, 1995, pp. 404–411.

Jean Lucas, Electra, Chapter 14, Inductive Thermal Plasma, Centre Francais de I'Electricite; 1997, pp. 635–636.

J. Reece Roth, Industrial Plasma Engineering, vol. 1: Principles, Chapter 11, IOP Publishing Ltd. 1995.

David Bernardi et al., Progress in Plasma Processing of Materials 2001; Proceedings of the Sixth European Conference on Thermal Plasma Processes, Strasbourg, France May 30–Jun. 3, 2000, pp. 359–364.

* cited by examiner

*Primary Examiner*—Wilson Lee
(74) *Attorney, Agent, or Firm*—Birch, Stewart, Kolasch & Birch, LLP

(57) ABSTRACT

An induction plasma torch comprises a tubular torch body, a gas distributor head located at the proximal end of the torch body for supplying at least one gaseous substance into the chamber within the torch body, a higher frequency power supply connected to a first induction coil mounted coaxial to the tubular torch body, a lower frequency solid state power supply connected to a plurality of second induction coils mounted coaxial to the tubular torch body between the first induction coil and the distal end of this torch body. The first induction coil provides the inductive energy necessary to ignite the gaseous substance to form a plasma. The second induction coils provide the working energy necessary to operate the plasma torch. The second induction coils can be connected to the solid state power supply in series and/or in parallel to match the impedance of this solid state power supply.

10 Claims, 1 Drawing Sheet

MULTI-COIL INDUCTION PLASMA TORCH FOR SOLID STATE POWER SUPPLY

This application is a divisional of pending prior application Ser. No. 10/265,586 filed on Oct. 8, 2002 (now U.S. Pat. No. 6,693,253), which is a continuation-in-part application of application Ser. No. 09/970,950 filed on Oct. 5. 2001 (now abandoned), the entire contents of which are hereby incorporated by reference and for which priority is claimed under 35 U.S.C. § 120.

FIELD OF THE INVENTION

The present invention relates to induction plasma torches. In particular but not exclusively, the present invention relates to a multiple-coil induction plasma torch.

BACKGROUND OF THE INVENTION

In induction plasma torches, a strong oscillating magnetic field is generated by an induction coil and applied to a gas passing through this coil to ionise the gas and form a plasma. Such induction plasma torches use the concept of inductive coupling itself consisting of inductively coupling a radio frequency (RF) field to the flowing gas. The inductive coupling heats the gas to a high temperature, typically 9 000° C. At that temperature, the gas turns into a plasma of positively charged ions and electrons. Plasma torches are typically used for spectroscopic elemental analysis, treatment of fine powders, melting of materials, chemical synthesis, waste destruction and the like. These applications derive from the high temperatures inherently associated with plasmas.

Early attempts to produce plasma by induction involved the use of a single-coil high frequency RF field (in the megahertz range). Attempts were also made to induce plasma formation using a lower frequency RF field (under 400 kHz) but were unsuccessful. These attempts to form plasmas using lower frequencies were driven by the belief that, at lower frequencies, the plasma is larger and has a more uniform temperature. It was also recognised at this stage that the process of igniting the plasma was different from that of running the plasma once ignited.

When operated at a high power level (above 10 kW) and a pressure equal to or higher than one (1) atmosphere, industrial inductive torches are difficult to ignite and to run stably. A dual coil, or RF-RF hybrid design has been proposed as a method to alleviate some of these problems.

Experimentation involving the use of dual coil induction plasma torches was underway in the mid 1960s. The article by I. J. Floyd and J. C. Lewis, "Radio-frequency induced gas plasma at 250–300 kc/s", Nature, Vol. 211, No. 5051, at p. 841 discloses the use of a dual coil system including:

- a higher frequency coil operating in the megahertz range to ignite, or initiate the plasma; and
- a second "work" coil operated at a lower frequency.

Continuing work on the dual coil plasma torch also revealed that, as expected, the lower frequency coil produced a plasma with a much more homogenous temperature. This, combined with a reduction of axial pressure, brought about an increase in dwell time and penetration of products which gave rise to benefits in the form of improved conditions for spheroidization treatment, or the spraying of powders.

Additionally, the presence of two separate induction stages was found to allow hot gases exiting the first stage to be mixed with a different gas which would otherwise adversely affect plasma sustainability. Moreover, the cascading of two induction coils allows the working parameters of the torch to be optimised, thereby increasing efficiency and reducing the power required to operate the plasma torch.

Two types of power supply have been used for supplying the considerable amount of power required to operate an induction plasma torch: a tube-type oscillator power supply and a solid state power supply.

Tube-type oscillator power supplies are notoriously inefficient with typically 40% of the input power being lost in the oscillator and tank circuit and only 20 to 40% of the input power being available as plasma enthalpy in the hot gas.

Solid state power supplies provide for more efficient operation and, therefore, constitute a better alternative. They exhibit, in comparison to tube-type oscillator power supplies, an overall efficiency in converting electrical energy from a relatively low supply voltage of 440 or 560 Volts at 50 or 60 Hz to a higher voltage of 1 500 to 3 000 Volts at 300 to 400 kHz. This increase in efficiency is largely due to the replacement of the standard, water-cooled triode or pentode tube oscillator with a solid state transistorised circuit.

Solid state power supplies, however, currently have a characteristic low frequency range of operation (typically between 300 to 400 kHz) and therefore are generally unsuitable for producing the required RF signal to the high frequency coil which is used to inductively ignite the plasma. Additionally, the use of efficient solid state power supplies has been proscribed in the applications requiring the ignition and operation of a plasma torch under atmospheric pressure or soft vacuum conditions.

Furthermore, existing dual coil designs using tube-type oscillator power supplies result in serious interactions between the control circuits of the two power supplies which can only be resolved by imposing a minimum separation between the coils. The imposition of a separation between the coils seriously affects the uniformity of the temperature field in the resulting plasma and has a direct impact on efficiency.

SUMMARY OF THE INVENTION

In accordance with the present invention, there is provided an induction plasma torch comprising a tubular torch body having proximal and distal ends, and including a cylindrical inner surface having a first diameter.

A plasma confinement tube is made of material having a high thermal conductivity, defines an axial chamber in which high temperature plasma is confined, and includes a cylindrical outer surface having a second diameter slightly smaller than the first diameter. The plasma confinement tube is mounted within the tubular torch body, and the cylindrical inner and outer surfaces are coaxial to define between these inner and outer surfaces a thin annular chamber of uniform thickness.

A gas distributor head is mounted on the proximal end of the torch body for supplying at least one gaseous substance into the axial chamber defined by the plasma confinement tube.

A cooling fluid supply is connected to the thin annular chamber for establishing a high velocity flow of cooling fluid in this thin annular chamber. The high thermal conductivity of the material forming the confinement tube and the high velocity flow of cooling fluid both contribute in efficiently transferring heat from the plasma confinement tube, heated by the high temperature plasma, into the cooling fluid to thereby efficiently cool the confinement tube.

A series of induction coils are mounted to the tubular torch body generally coaxial with this tubular torch body between the proximal and distal ends of the torch body. This series of induction coils comprises;

- a first induction coil connected to a higher frequency output of a first power supply to inductively apply energy to the at least one gaseous substance supplied to the axial chamber; and
- a plurality of second induction coils between the first induction coil and the distal end of the tubular torch body, the second induction coils having respective terminals.

An interconnection circuit is interposed between (a) first and second terminals of a lower frequency output of a second power supply and (b) the terminals of the second induction coils, to connect the second induction coils in a series and/or parallel arrangement between these first and second terminals in order to:

- substantially match an input impedance of the second induction coils with an output impedance of the second power supply; and
- inductively apply energy to the at least one gaseous substance supplied to the axial chamber.

According to another aspect, the induction plasma torch of the present invention further comprises the first power supply having a higher frequency output, and the second power supply having a lower frequency output including first and second terminals.

The foregoing and other objects, advantages and features of the present invention will become more apparent upon reading of the following non restrictive description of an illustrative embodiment thereof, given by way of example only with reference to the accompanying drawings.

DETAILED DESCRIPTION OF THE ILLUSTRATIVE EMBODIMENT

Figure 1:
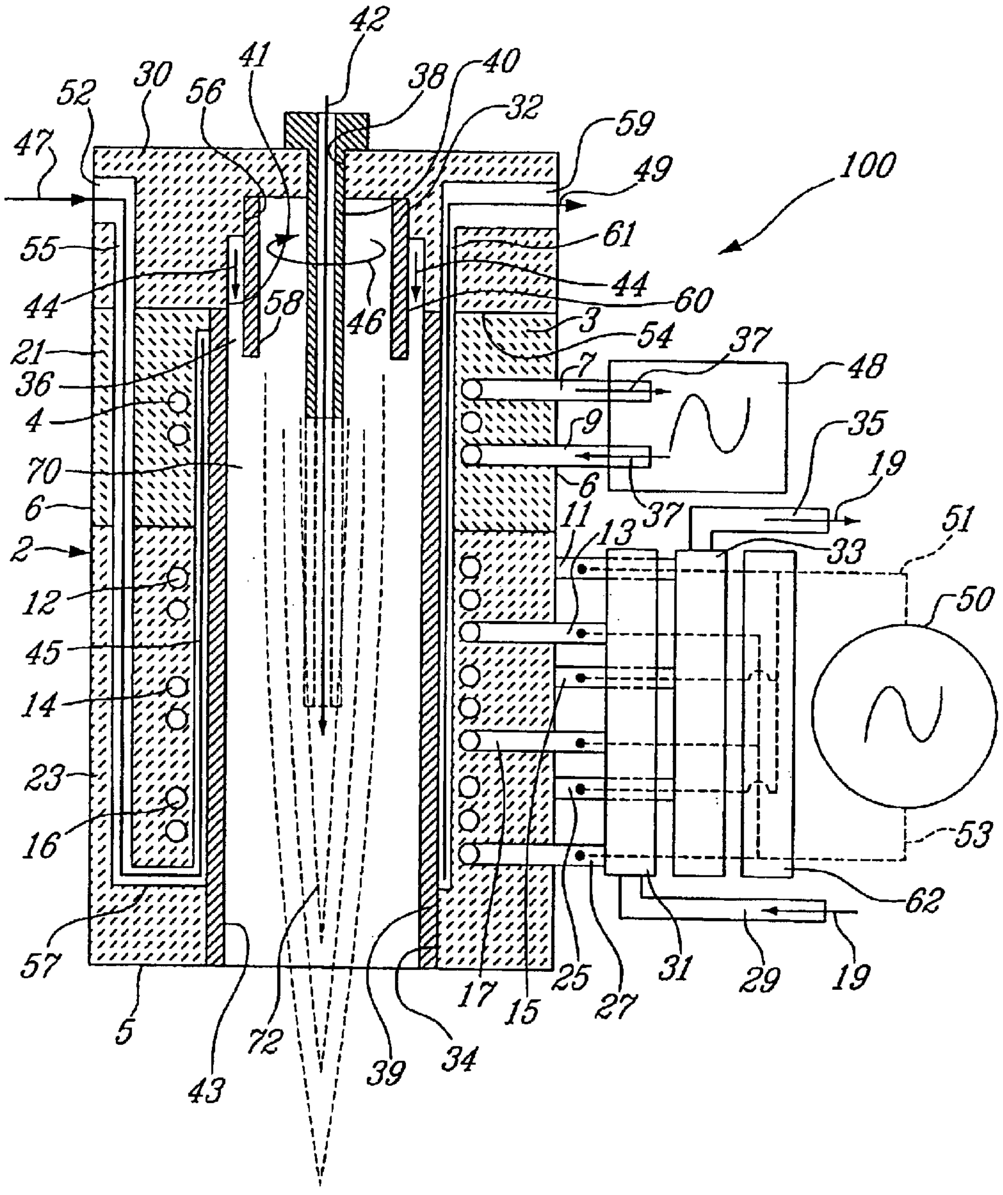
FIG. 1 is an elevation, cross-sectional view of an illustrative embodiment of multi-coil induction plasma torch in accordance with the present invention, comprising a water-cooled confinement tube.

FIG. 1 shows the illustrative embodiment of multi-coil induction plasma torch generally identified by the reference 100. More specifically, the illustrative embodiment as shown in FIG. 1 forms a high impedance matched multi-coil induction plasma torch capable of generating an inductively coupled gas plasma.

The multi-coil induction plasma torch 100 of FIG. 1 comprises a tubular (for example cylindrical) torch body 2 made of proximal 21 and distal 23 tubular pieces made of cast ceramic or composite polymer and assembled end to end. Other suitable materials could also be contemplated to fabricate the tubular pieces 21 and 23 of the torch body 2. This tubular torch body 2 has proximal 3 and distal 5 ends, and defines an axial chamber 70 in which a plasma 72 is ignited and sustained.

Still referring to the illustrative embodiment as shown in FIG. 1, the tubular torch body 2 has an inner cylindrical surface lined with a cylindrical, relatively thin plasma confinement tube 39 coaxial to the torch body 2. As a non limitative example, the plasma confinement tube 39 can be made of ceramic material.

A series of induction coils 4, 12, 14 and 16 are mounted to the tubular torch body 2 generally coaxial with this tubular torch body between the proximal 3 and distal 5 ends.

The series of induction coils comprises a first induction coil 4 made of a water-cooled copper tube completely embedded in the proximal piece 21 of the tubular torch body 2. This first induction coil 4 is substantially coaxial with the tubular torch body 2 and is located at the inner end of a tubular probe 40. However, it should be pointed out that the position of the probe 40 is not limited to the case illustrated in FIG. 1 since the induction plasma torch 100 is usually operated with the probe 40 penetrating well in the plasma 72 to the level of the third coil 14. The two ends of the first induction coil 4 both extend to the outer surface 6 of the tubular torch body 2 to form a pair of terminals 7 and 9 through which both cooling water and RF current can be supplied to the coil 4.

Similarly, the series of induction coils comprises a second induction coil 12, a third induction coil 14 and a fourth induction coil 16 also made of water-cooled copper tubes completely embedded in the distal piece 23 of the tubular torch body 2. The induction coils 12, 14 and 16 are coaxial with both the tubular torch body 2 and the first induction coil 4. As illustrated in FIG. 1, the induction coils 12, 14 and 15 are positioned between the first induction coil 4 and the distal end 5 of the tubular torch body 2.

In the illustrative embodiment as shown in FIG. 1, the second coil 12, the third coil 14 and the fourth coil 16 all exhibit the same characteristic inductance, and the series of the first 4, second 12, third 14 and fourth 16 induction coils are shifted from one another along their common axis.

Eventually, the coils 12, 14 and 16 could also be helically entwined such that a loop of a given coil finds itself directly above and/or below a loop of another coil.

Additionally, in the illustrative embodiment of FIG. 1, the coils 4, 12, 14 and 16 all have the same radius. However, those of ordinary skill in the art will appreciate that inductive coils of different diameters could also be used to adapt and/or optimise the operating characteristics of the induction plasma torch.

The two ends of the second induction coil 12 both extend to the outer surface 6 of the torch body 2 to form a pair of terminals 11 and 13 through which both cooling water and RF current can be supplied to this coil 12. Similarly, the two ends of the third induction coil 14 both extend to the outer surface 6 of the torch body 2 to form a pair of terminals 15 and 17 through which both cooling water and RF current can be supplied to this coil 14. Finally, the two ends of the fourth induction coil 16 extend to the outer surface 6 of the torch body 2 to form a pair of terminals 25 and 27 through which both cooling water and RF current can be supplied to coil 16.

Referring to FIG. 2, cooling water 19 is supplied to the copper tubes forming the coils 12, 14 and 16 through a conduit 29, a manifold 31, and the terminals 13, 17 and 27. This cooling water 19 is recuperated through the terminals 11, 15 and 25, a manifold 33 and a conduit 35.

Still referring to FIG. 1, cooling water 37 is supplied to the copper tube forming the coil 4 through the terminal 9. This cooling water 37 is recuperated through the terminal 7.

A gas distributor head 30 is fixedly secured to the proximal end 3 of the torch body 2 by means, for example, of a plurality of bolts (not shown). The gas distributor head 30 comprises an intermediate tube 32. A cavity is formed in the underside 54 of the head 30, which cavity defines a proximal, smaller diameter cylindrical wall portion 56, and a distal, larger diameter cylindrical wall portion 41. The cylindrical wall portion 41 has a diameter equal to the internal diameter of the plasma confinement tube 39. The cylindrical wall portion 56 has a diameter dimensioned to receive the corresponding end of the intermediate tube 32. Intermediate tube 32 is shorter and smaller in diameter than the plasma confinement tube 39. The tube 32 is cylindrical and generally coaxial with the torch body 2 and the induction coils 4, 12, 14 and 16. A cylindrical cavity 36 is defined between the intermediate tube 32 and the cylindrical wall portion 41 and an inner surface 43 of the plasma confinement tube 39.

The gas distributor head 30 may be provided with a central opening 38 through which the tubular, central injection probe 40 is introduced and secured. The injection probe 40 is elongated and generally coaxial with the tube 32, the torch body 2, the plasma confinement tube 39 and the induction coils 4,12,14 and 16. In many instances, powder and a carrier gas (arrow 42), or precursors for a synthesis reaction, are injected in the chamber 70 of the plasma torch 100 through the probe 40. The powder transported by the carrier gas and injected through the probe 40 constitutes a material to be molten or vaporized by the plasma or material to be processed, as well known to those of ordinary skill in the art.

The gas distributor head 30 also comprises conventional conduit means (not shown) adequate to inject a central gas (arrow 46) inside the intermediate tube 32 and to cause a tangential flow of this gas on the cylindrical inner surface 58 of this tube 32.

The gas distributor head 30 further comprises conventional conduit means (not shown) adequate to inject a sheath gas (arrows 44) within the cylindrical cavity 36 between (a) the cylindrical outer surface 60 of the intermediate tube 32 and (b) the cylindrical wall portion 41 and the inner surface 43 of the plasma confinement tube 39 and to cause an axial flow of this sheath gas in the cylindrical cavity 36.

It is believed to be within the skill of an expert in the art to select (a) the structure of the powder injection probe 40 and of the plasma gas conduit means (arrows 44 and 46), (b) the nature of the powder, carrier gas, central gas and sheath gas, and (c) the materials of which are made the gas distributor head 30, the injection probe 40 and the intermediate tube 32 and, accordingly, these features will not be further described in the present specification.

As illustrated in FIG. 1, a thin (approximately 1 mm thick) annular chamber 45 is defined between the inner surface of the torch body 2 and the outer surface of the confinement tube 39. High velocity cooling fluid, for example water, flows in the thin annular chamber 45 over the outer surface of the tube 39 (arrows such as 47,49) to cool this confinement tube 39 of which the inner surface 43 is exposed to the high temperature of the plasma.

The cooling water (arrow 47) is injected in the thin annular chamber 45 through an inlet 52, a conduit 55 extending through the gas distributor head 30 and the tubular torch body 2, and an annular conduit means 57 structured to transfer the cooling water from the conduit 55 to the lower end of the annular chamber 45.

The cooling water from the upper end of the thin annular chamber 45 is transferred to an outlet 59 (arrow 49) through a conduit 61 formed in the upper portion of the tubular torch body 2 and the gas distribution head 30.

The ceramic material of the plasma confinement tube 39 can be pure or composite ceramic materials based on sintered or reaction bonded silicon nitride, boron nitride, aluminum nitride and alumina, or any combinations of them with varying additives and fillers. This ceramic material is dense and characterized by a high thermal conductivity, a high electrical resistivity and a high thermal shock resistance.

As the ceramic body of the plasma confinement tube 39 presents a high thermal conductivity, the high velocity of the cooling water flowing in the thin annular chamber 45 provides a high heat transfer coefficient suitable and required to properly cool the plasma confinement tube 39. The intense and efficient cooling of the outer surface of the plasma confinement tube 39 enables production of plasma at much higher power at lower gas flow rates than normally required in standard plasma torches comprising a confinement tube made of quartz. This causes in turn higher specific enthalpy levels of the gases at the exit of the plasma torch.

As can be appreciated, the very small thickness (approximately 1 mm thick) of the annular chamber 45 plays a key role in increasing the velocity of the cooling water over the outer surface of the confinement tube 39 and accordingly to reach the required high thermal transfer coefficient.

The induction coils 4, 12, 14 and 16 being completely embedded in the cast ceramic or composite polymer of the torch body 2, the spacing between the induction coils and the plasma confinement tube 39 can be accurately controlled to improve the energy coupling efficiency between the induction coils and the plasma. This also enables accurate control of the thickness of the annular chamber 45, without any interference caused by the induction coils, which control is obtained by machining to low tolerance the inner surface of the torch body 2 and the outer surface of the plasma confinement tube 39.

In operation, the inductively coupled plasma 72 is generated by applying a RF electric current to the first 4, second 12, third 14 and fourth 16 induction coils to produce a RF magnetic field within the axial chamber 70. The applied field induces Eddy currents in the ionized gases and by means of Joule heating, a stable plasmoid is sustained. The operation of an induction plasma torch, including ignition of the plasma, is believed to be otherwise within the knowledge of one of ordinary skill in the art and does not need to be further described in the present specification.

The RF electric current supplied to the first induction coil 4 by the oscillator power supply 48 is responsible for the ignition and stabilisation of the generated plasma 72. Since ignition requires a higher frequency RF current, the oscillator power supply 48 can be, for example, a tube-type higher frequency oscillator power supply. Therefore, power supply 48 has a higher frequency output connected to the terminals 7 and 9 to supply a higher frequency RF current to the first induction coil 4, which is the induction coil closest to the gas distributor head 30. In this manner, higher frequency energy is inductively applied to the gaseous substance(s) supplied to the axial chamber 70 to ignite, sustain and stabilize the plasma 72. The oscillator power supply 48 may operate in the 3 MHz range with an operating voltage of 6 to 15 kV. It should be kept in mind that the voltage range, the operating frequency and the amplitude of the RF current from the power supply 48 can be changed to meet with the particular requirements of the intended application.

A second lower frequency power supply 50 has a lower frequency output including two terminals 51 and 53 connected to the induction coils 12, 14 and 16 via an interconnection circuit 62 and the terminals 11 and 13, 15 and 17, and 25 and 27, respectively. In this manner, lower frequency energy is inductively applied to the gaseous substance(s) supplied to the axial chamber 70 to further sustain and stabilize the plasma 72. In this second illustrative embodiment, the power supply 50 can be a solid state power supply. For example, such a solid state power supply 50 may have an operating voltage of 2 kV and a high output current. The output current varies in relation to the current rating of the installation and in some cases may exceed 1000 amperes. The operating frequency of the power supply may typically range between 200 kHz and 400 kHz. Again, it should be kept in mind that the operating voltage and frequency as well as the level of the output current from the power supply 50 can vary to meet with the requirements of the intended application.

In a conventional dual coil plasma torch installation operating with a dual high power tube-type oscillator power supply, a significant gap between the individual induction coils must be provided to ensure adequate electrical insulation and minimise cross talk between the two power supplies which can adversely affect the control circuits of these power supplies. Typically, this gap is of the order of 5 to 10 cm. By combining a solid state power supply such as 50 operating at low voltage with a conventional, high voltage, tube-type oscillator power supply such as 48, the gap 52 between the first induction coil 4 and the second induction coil 12 can be reduced to a few centimetres, and can be as small as two or three centimetres, while at the same time maintaining good electrical insulation and minimising cross talk.

In this illustrative embodiment, the solid state power supply 50 requires an inductive load equal to ⅓$^{rd}$ of the inductive load of the separate coil 12, coil 14 or coil 16. If we consider that the impedances of the coils 12, 14 and 16 are equal, the required inductive load is obtained by connecting the second coil 12, the third coil 14 and the fourth coil 16 in parallel between the terminals 51 and 53 of the solid state power supply 50. Corresponding connections are shown in dotted lines in the interconnection circuit 62.

By combining multiple coils (such as coils 12, 14 and 16), the output impedance of the solid state power supply 50 and the input impedance of the induction coils (coils 12, 14 and 16 in the illustrative embodiment) sustaining the induction plasma can be substantially matched, thereby increasing the overall energy coupling efficiency of the inductively coupled plasma torch. In fact, the complex load as seen by the solid state power supply 50 varies as a function of the number of coils supplied by this solid state power supply 50. Connecting the induction coils (such as coils 12, 14 and 16) in parallel and/or in series between the terminals 51 and 53 through the interconnection circuit 62 has the effect of altering the complex load. More specifically, the inductance value of the complex load will increase by connecting the induction coils (such as coils 12, 14 and 16) in series and will decrease by connecting these induction coils in parallel. Therefore, by selecting the optimal interconnection of the coils (such as coils 12, 14 and 16) in series and/or in parallel with each other, the input impedance of the induction coils can be matched with the output impedance of the solid state power supply 50.

Of course, it is within the scope of the present invention to use a number of second induction coils smaller or larger than 3, instead of three (3) coils 12, 14 and 16.

The use of a multi-coil design allows for the first time substantial matching of the input impedance of the induction coils 12, 14 and 16 with the output impedance of the power supply 50. This is particularly critical when a solid state (transistor) RF power supply 50 is used since they have a relatively rigid design and cannot tolerate a large mismatch between the output impedance of the power supply and the input impedance of the induction coils.

For clarity the following numerical example is given.

Given that the equivalent coil impedance is defined by the following equation:

$$L_c = a \cdot N_c^2 \cdot d_c \cdot e / Z_c$$

where: a=constant ($4.0\times10^{-6}$);

$N_c$=the number of turns in the coil;

$d_c$=the internal coil diameter;

$d_n$=the plasma or load diameter;

$e=(d_c-d_n)/2$; and $Z_c$=coil length.

Also, given that for a $N_s$ (number of coils Ns=3) coil segment, the equivalent coil impedance is given by:

$$L_{eq} = L_c / N_s$$

The equivalent coil impedance for a multi-turn coil made up, for example, of three (3) segments each of two (2) turns:

$$L_{eq} = (4/3) L_{single\ turn\ coil}$$

Such fractional values of coil impedance cannot be achieved by any of known alternate induction plasma coil designs, which are limited to an integer number multiple of "single coil turns".

Although the present invention has been described hereinabove with reference to illustrative embodiments thereof, these embodiments can be modified at will, within the scope of the appended claims, without departing from the spirit and nature of the present invention.

What is claimed is:

1. An induction plasma torch comprising:

a tubular torch body having proximal and distal ends, and defining an axial chamber in which high temperature plasma is produced;

a gas distributor head mounted to the proximal end of the tubular torch body for supplying at least one gaseous substance into the axial chamber;

a first power supply having a higher frequency output;

a second power supply having a lower frequency output and including first and second terminals;

a series of induction coils mounted to the tubular torch body generally coaxial with said tubular torch body between the proximal and distal ends of the torch body, the series of induction coils comprising;

a first induction coil connected to the higher frequency output of the first power supply to inductively apply energy to the at least one gaseous substance supplied into the axial chamber; and a plurality of second induction coils between the first induction coil and the distal end of the tubular torch body, the second induction coils having respective terminals; and an interconnection circuit interposed between (a) said first and second terminals of the lower frequency output of the second power supply and (b) the terminals of the second induction coils, to connect the second induction coils in a series and/or parallel arrangement between said first and second terminals in order to:

substantially match an input impedance of the second induction coils with an output impedance of the second power supply; and inductively apply energy to said at least one gaseous substance supplied into the axial chamber.

2. An induction plasma torch as defined in claim 1, wherein the second power supply is a solid state power supply.

3. An induction plasma torch as defined in claim 1, wherein the first power supply is a tube-type oscillator power supply, and the second power supply is a solid state power supply.

4. An induction plasma torch as defined in claim 1, wherein the second induction coils are connected, through the interconnection circuit, in parallel between the first and second terminals of the lower frequency output of the second power supply.

5. An induction plasma torch as defined in claim 1, wherein the second induction coils are connected, through the interconnection circuit, in series between said first and second terminals of the lower frequency output of the second power supply.

6. An induction plasma torch as defined in claim 1, wherein the second induction coils are connected, through the interconnection circuit, in a series and parallel arrangement between the first and second terminals of the lower frequency output of the second power supply.

7. An induction plasma torch as defined in claim 1, wherein the first and second induction coils are embedded in the tubular torch body.

8. An induction plasma torch as defined in claim 1, wherein the second induction coils are helically entwined.

9. An induction plasma torch as defined in claim 1 wherein the second induction coils form a series of induction coils between the first induction coil and the distal end of the tubular torch body.

10. An induction plasma torch comprising:

a tubular torch body having proximal and distal ends, and defining an axial chamber in which high temperature plasma is produced;

a gas distributor head mounted to the proximal end of the tubular torch body for supplying at least one gaseous substance into the axial chamber;

a series of induction coils mounted to the tubular torch body generally coaxial with said tubular torch body between the proximal and distal ends of the torch body, the series of induction coils comprising;

a first induction coil connected to a higher frequency output of a first power supply to inductively apply energy to the at least one gaseous substance supplied into the axial chamber; and a plurality of second induction coils between the first induction coil and the distal end of the tubular torch body, the second induction coils having respective terminals; and an interconnection circuit interposed between (a) first and second terminals of a lower frequency output of a second power supply and (b) the terminals of the second induction coils, to connect the second induction coils in a series and/or parallel arrangement between said first and second terminals in order to:

substantially match an input impedance of the second induction coils with an output impedance of the second power supply; and inductively apply energy to said at least one gaseous substance supplied into the axial chamber.

* * * * *